Figure 1:
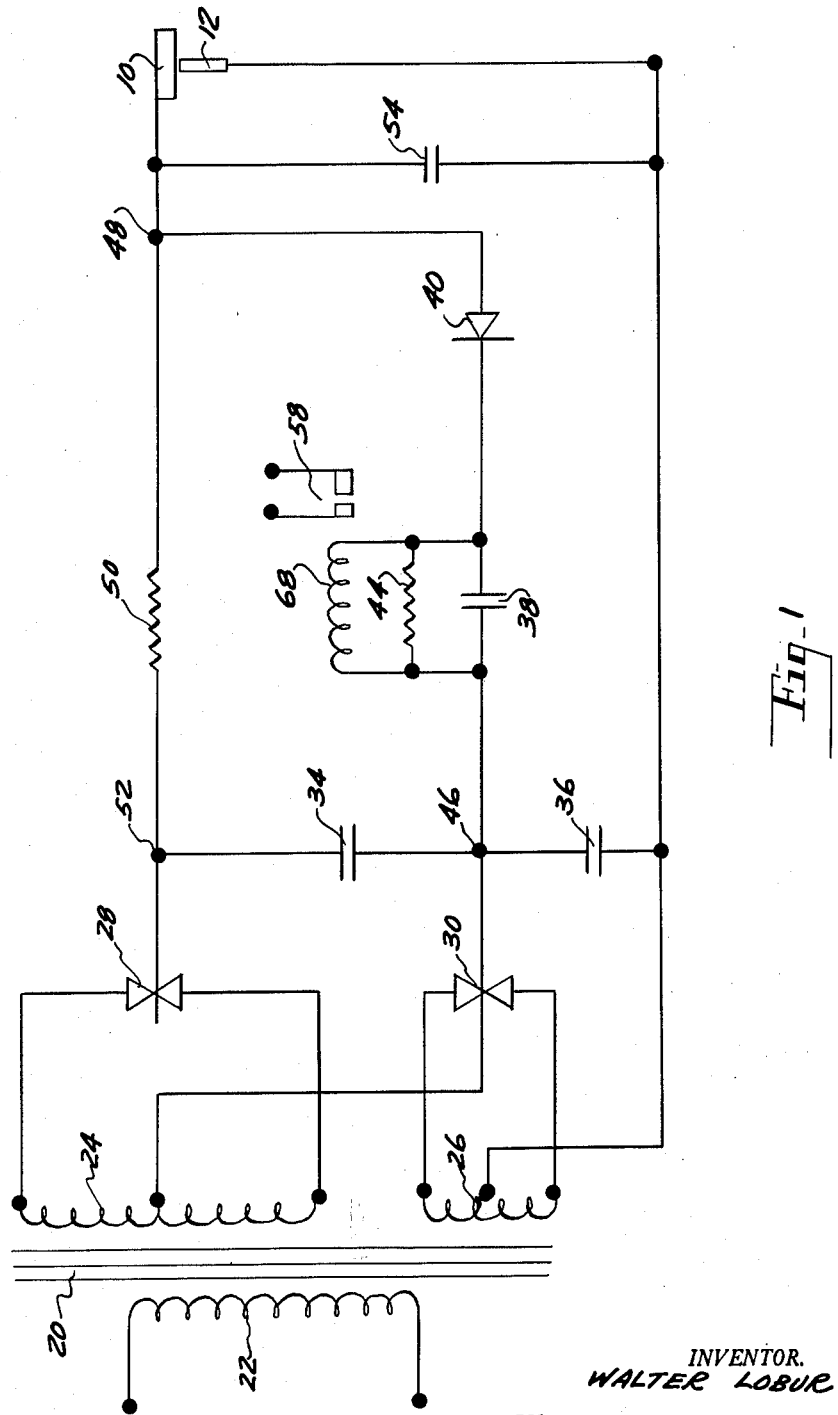

March 3, 1964 W. LOBUR 3,123,740
FAIL SAFE SPILLOVER CIRCUIT
Filed July 11, 1960 2 Sheets-Sheet 2

INVENTOR.
WALTER LOBUR
BY
M K Murphy
ATTORNEY

United States Patent Office 3,123,740
Patented Mar. 3, 1964

3,123,740
FAIL SAFE SPILLOVER CIRCUIT
Walter Lobur, Clawson, Mich., assignor to Elox Corporation of Michigan, Troy, Mich., a corporation of Michigan
Filed July 11, 1960, Ser. No. 41,875
15 Claims. (Cl. 315—127)

This invention relates to improvements in methods and apparatus for electrical-discharge-machining and particularly to an improved "spillover circuit" for use in such apparatus.

The advantages inherent in the use of a spillover voltage circuit for electrical-discharge-machining are set forth in part in Matulaitis Patent No. 2,794,152, granted May 28, 1957.

The circuitry described and claimed in that patent is generally satisfactory for EDM apparatus of average performance. Diodes such as shown at 40 in FIG. 6 of that patent are typically solid state rectifiers of selenium, germanium or silicon, and while these elements are quite satisfactory for EDM apparatus operating at frequencies in the 20,000 cycles or lower ranges, increase in EDM gap pulse frequency above 20,000 cycles (approximately) renders these devices unsatisfactory because of their inherently high capacity and storage time characteristics.

For example, operating experience with the Matulaitis circuits above referred to has demonstrated that as the gap pulse frequency is raised above about 20,000 cycles even when low machining current is passed, the repetitive conduction-blocking cycle of the diode causes the diode to overheat, and as this occurs, reverse current flow increases further and further until breakdown of the junction takes place. At relatively high frequencies, this breakdown occurs at almost zero current flow. For example, at 100 kc., a selenium diode acts more like a capacitor than a rectifier and the resultant circulating currents soon destroy the diode.

A silicon rectifier will overheat if as little as 10% of the D.C. rating of this rectifier is conducted through the rectifier at 100 kc., thereby necessitating marginal operation of this device. When operated in this manner, in high frequency-high performance EDM, it is not uncommon for these rectifiers to break down and fuse for normal current conduction into an A.C. short. Should such a condition occur in Matulaitis' FIGURE 6, the obvious results would be disastrous in that the full voltage of supply 36 would then be directly connected across the machining gap and thereby result in extremely high short circuit currents destroying both the electrode and the work as well as the D.C. supply furnishing power to condenser 36. This, of course, results in the complete destruction of several costly components in addition to an electrode and workpiece, costing perhaps several thousand dollars.

It is therefore the object of my invention to provide an improved spillover circuit or circuits which are adapted for operation at high frequencies and which, if they fail, will "fail safe" and not cause damage to the work or to the apparatus or danger to the operator.

Figure 2:
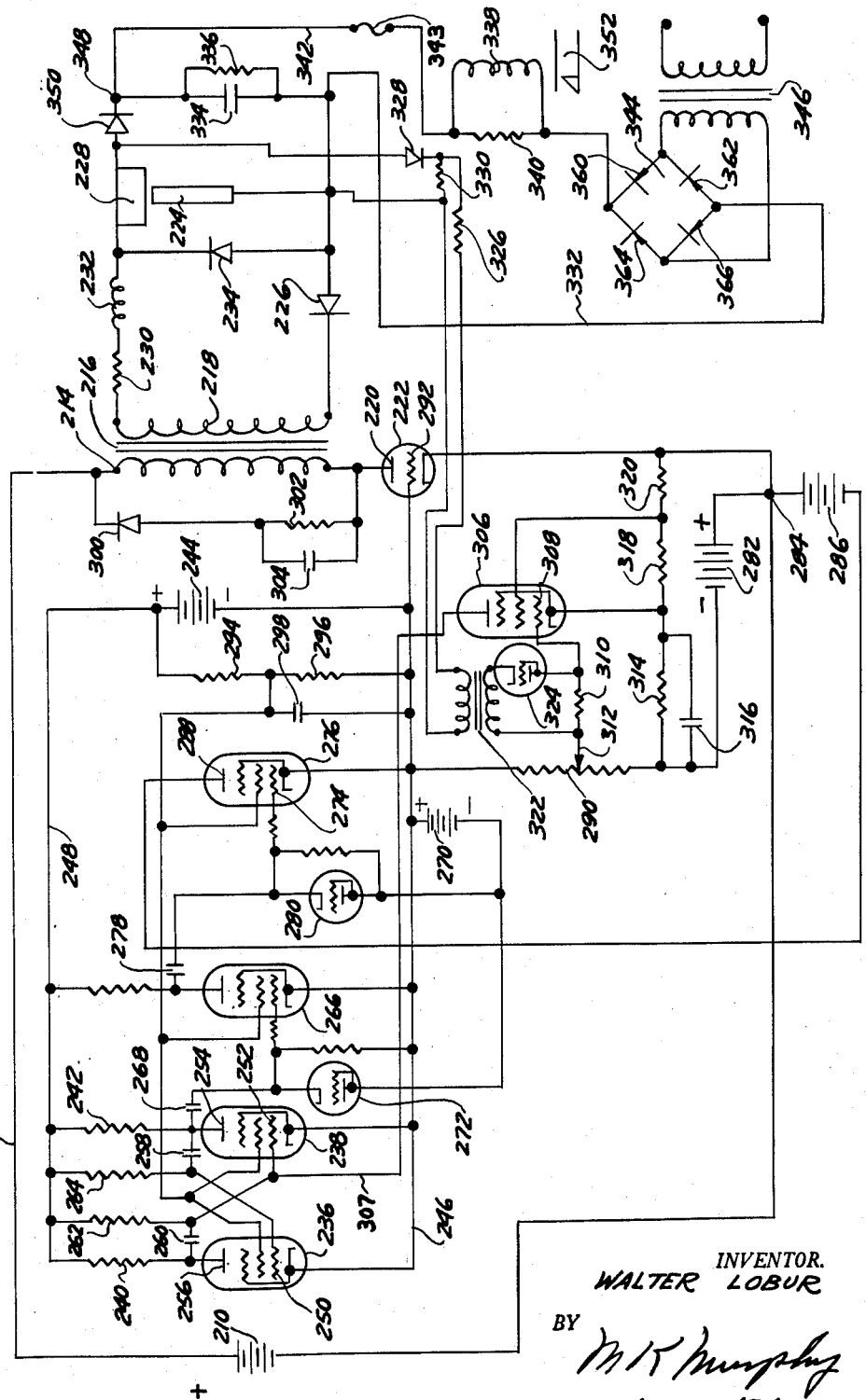

In the accompanying drawings in which reference characters designate like parts or components referred to below:

FIG. 1 is an improved version of the circuit shown in FIG. 6 of Matulaitis Patent No. 2,794,152; and FIG. 2 is an example of a modern EDM circuit capable of operation at high frequencies and at high currents with complete spillover protection.

Referring now to FIG. 1, it will be seen that the EDM power is drawn from an A.C. line through transformer 20, which has a primary 22 and secondaries 24, 26.

The secondaries are series connected in full wave rectification arrangement with the rectifiers 28 and 30 and the filter condensers 34 and 36. A third rectifier diode 40 is connected between the workpiece 10 and the output terminal 46. The workpiece is connected also through a resistor 50 to output terminal 52. A condenser 54 is connected across the machining gap.

The center tap of secondary 24 is connected to the output of diode 30 while the center tap of secondary 26 is connected to the machining electrode 12. In the line connecting diode 40 with terminal 46, I have inserted a condenser 38 which is shunted by a relay coil 68 and a parallel resistor 44. The condenser 38 serves as a low impedance path for the high frequency pulses conducted through diode 40 to terminal 48 in the circuit.

The resistance and voltage drop of coil 68 is selected in accordance with the reference voltage of secondary 26 and the current to be conducted. This is nearly always a high current-low voltage relay operating on approximately 1 ampere of current and 3 to 5 volts D.C. In addition, relay coil 68 may be shunted by resistor 44 to provide additional current flow depending upon the clipping requirements of the power circuitry in accordance with the principles disclosed in Matulaitis. Relay coil 68 and resistor 44 are selected such that normal performance of the circuit and normal operation of diode 40 is insufficient to energize relay coil 68. Should a malfunction occur, such as diode 40 shorting or some other excessively positive voltage at terminal 48, relay coil 68 will energize and actuate contacts 58 to interrupt the appropriate control circuitry. These contacts may control cutting power direct or more logically control the main cutting power contactor in such a manner that machine power is interrupted upon actuation of relay 58 and opening of the contacts. Several objections may arise from this form of circuitry although it is a distinct improvement over that of Matulaitis. The first is that winding 68 may, for one reason or another, be open circuited or short circuited in such a manner that it is incapable of energizing upon this failure condition. A second objection is that storage condenser 34 or 36 are generally of substantial capacity and voltage for a high power EDM apparatus. Since winding 68 is low voltage, low resistance, it has happened on occasion that the combined capacity of capacitors 34 and 36 was sufficient to burn out coil 68 upon shorting of diode 40. Still another form of malfunction of this circuit may occur if the cause of excess voltage between electrode 12 and workpiece 10 occurs external to the power supply, such as by a power line shorting to the insulated conductor whether it be attached to the electrode or workpiece. This on occasion happens when special accessories are mounted on the insulated member or due to other mechanical or electrical failure in the associated wiring. It is desirable to have the protection circuit actuated by the relay coil 68 protected from any of these forms of malfunction. Typically in FIGURE 1, relay 58 frequently actuates to interrupt power on the first malfunction; however, this form of power interruption may be reset by the operator and upon repetition of error, destroy coil 68 and render the protection circuit inoperative.

In FIG. 2, I have shown a "fail safe" spillover protection circuit which is a still further improvement over the Matulaitis device.

In FIG. 2, I have shown a modern EDM circuit of the impedance matching type.

Referring to FIG. 2, it will be seen that I have shown at 210 the main power supply for the apparatus, which comprises a 300 volt, D.C. supply, this voltage being about maximum for the plate supply of the 6AS7 power tubes. A lead 212 from the positive side of the power supply connects to one side of primary 214 of the power transformer 216. The latter has a secondary 218 and is of the iron-core type, although an air-core transformer may be used for more delicate machining, particularly finishing operations.

The other side of primary 214 is connected to the anode 220 of a power tube 222. It will be understood that the tube 222 represents a bank of tubes (in this instance 6AS7's) connected in parallel. Almost any number of such tubes may be so connected to provide the required power flow through the gap.

The secondary 218 of the power transformer 216 is connected at one side to the electrode 224 through a blocking diode 226, and at the other side to a workpiece 228. The elements 230 and 232 represent respectively the lumped resistance and lumped inductance of the leads from the secondary 218 to the gap between the electrode and workpiece. The gap is shunted by a second blocking diode 234 as will be explained below.

The power tube bank 222 is controlled by a multivibrator network which comprises tubes 236 and 238. These tubes are preferably pentodes, type 6DQ5. The plates or anodes of these tubes are connected through load resistors 240, 242, and lead 248 to the positive terminal of a suitable power supply 244, the negative terminal of which is connected with the cathodes of the tubes by lead 246. The power supply 244 may be separate or it may be derived from the main supply 210 as desired.

The control grids 250, 252, of the tubes 236, 238, are cross-connected to the anodes 254, 256, respectively through coupling condensers 258, 260, and are connected to the positive side of the multivibrator power supply through the grid resistors 262, 264.

The output signal from multivibrator tubes 236, 238, is fed into an amplifier, which may comprise one or more pentode tubes 266, through condenser 268 and clamped to negative bias voltage 270 through diode 272. The amplified and resquared signal from tube 266 is fed to the grid 274 of pentode 276 (which may be one of a bank) where it is again amplified before being fed to the power tube bank 222. The coupling to the "driver" tube 276 is through a coupling condenser 278 and a clamping diode 280 is provided to insure positive cut-off characteristic. Suitable isolation and signal resistors are also provided as shown to control the operating characteristics of diodes 272 and 280.

The power required to drive the main power tube bank 222 is in the order of several hundred watts, and to obtain increased efficiency, the amplifier 276 is floated in the grid circuit of the bank 222 rather than connected to the negative terminal of bias supply 282 as would be expected. Since the control signal appears between the cathode of driver 276 and point 284 of the circuit which is grounded, the network just described, which comprises a multivibrator and two stages of amplification, may be thought of as a floating signal source.

The output signal from this network is of rectangular wave form and is of substantially greater magnitude than that obtained from the conventional square wave generator. Normally these signal generators have an output of approximately ten watts. In the EDM circuit of FIG. 2, the power required to drive the grids of the tube bank 222 is in the order of two hundred watts and more. A booster power supply 286 is preferably provided in series with the bias supply 282 to provide adequate voltage for the plate 288 of driver 276.

The output signal from driver tube 276 is developed from the voltage drop across variable resistor 290, which signal pulse with the added voltage of power source 282 constitutes the drive to the grids 292 of the bank 222. Proper adjustment of the circuit parameters will provide a signal at grids 292 having a selected on-time characteristic.

As stated above, the signal generator power supply is the source 244. Resistors 294 and 296, the latter being shunted by a condenser 298, are provided as shown.

The primary 214 of transformer 216 has a damping network consisting of diode 300, resistor 302 and shunt capacitance 304 connected in shunt therewith.

The transformer 216 must be a stepdown transformer capable of handling relatively high currents at relatively high frequencies. The development of extremely thin iron lamination stock and specialized design now makes possible the design of transformers having the characteristics required for the circuit of FIG. 2. The transformer selected should have a maximum voltage swing on the primary equal to the peak voltage rating of the power tube selected and a turns ratio which will match the gap voltage required in EDM.

The aforementioned damping network limits the induced voltage or negative fly-back in the primary 214, which occurs between power pulses, to the voltage rating of the tubes 222 and this prolongs the lives of these tubes.

As so far described, it will be seen that the tube bank 222 normally is biased to non-conducting condition by voltage source 282. An amplified signal from the multivibrator will be impressed on the grids 292 of the power bank 222 and will overcome the normal grid bias and render the tube bank conductive. In accordance with the preselected adjustment of the circuit parameters, a voltage will occur across the primary 214 which will induce a voltage in the secondary. This secondary voltage is instantly effective across the gap between electrode 224 and workpiece 228, and a power pulse will be delivered across the gap eroding the workpiece. This sequence is repeated at high frequency until the machining operation is completed or the operation interrupted by the machine's power feed, as is known in the art.

The gap between electrode 224 and workpiece 228 is flooded with dielectric fluid during machining as is common in EDM.

The circuit of FIG. 2 includes a "watch-dog," which functions automatically to cut off the power to the gap in event of a short circuit condition, which might damage the workpiece, or in event of malfunction of the apparatus, which might cause damage to the workpiece or to the components of the apparatus.

This "per pulse cut-off" comprises a pentode 306, the control grid 308 of which is connected through a resistor 310 to tap 312, which latter taps the keying resistor 290 at an intermediate point. The grid 308 normally is biased non-conducting by the shunt resistor and condenser network 314, 316, which is connected across the voltage source 282 through the screen voltage resistor 318 and the voltage reducing resistor 320. The voltage across resistor 290 plus that of the source 282 is, of course, the voltage which drives the grids 292 of the power tube bank 222. A selected portion of this voltage is thus effective on the grid 308 of cut-off tube 306 and tends to render tube 306 conductive whenever bank 222 is rendered conductive. The plate of tube 306 is connected to the grid circuit of multivibrator tube 238 by line 307 and conduction through tube 306 will instantaneously cut-off operation of the multivibrator.

However, the secondary of a transformer 322 (called for convenience the "cut-off transformer") is connected across the resistor 310 through a blocking diode 324. The primary of the transformer 322 is connected across the gap between electrode 224 and workpiece 228 through a limiting resistor 326.

A diode 328 is connected in one line of the secondary circuit to prevent reverse conduction and the two secondary leads are bridged by a high value ohmic resistor 330.

If the apparatus is functioning normally, a drive signal on grids 292 of the bank 222 will result in a striking voltage appearing across secondary 218 of power transformer 216 and the gap will fire. This voltage would have to be only about 20 if there were no losses in the firing circuit. However, normal circuit losses require a voltage magnitude of 60 volts or more, and should a short circuit occur across the gap, the short circuit current would be almost 150% of normal. With narrow pulse operation, the peak current selected is usually the peak pulse rating of the individual tubes of the power tube bank, and a 150% overload of this pulse current would strip the tube cathodes with comparatively few pulses. Thus ordinary short circuit cut-off devices, such as thermally responsive devices, operate too slowly to provide protection.

The per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, where heat checking of the hole being cut might require scrapping of the piece. The readiness of the device to function instantly is constantly maintained by the precise balancing of the circuit parameters. The connection of grid 308 to the keying resistor 290 tends to render tube 306 conductive each time the multivibrator pulses, but the dominating negative bias of the network 314–316 inhibits conduction of tube 306 in the absence of any keying signal. During normal operation, the keying pulse voltage developed across resistor 290 is exactly neutralized in the grid circuit of tube 306 by the action of circuit 322, 324, 310. However, appearance of a voltage across primary of transformer 322 (gap voltage) lower than a preset minimum will upset this voltage balance and instantaneously cause tube 306 to conduct and cut off the multivibrator through line 307. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator, will of course, cut off tube bank 222 as well as tube 306. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

The fail safe spillover circuit comprises a transformer 346 having a primary connected to a suitable source of A.C. power, preferably the main supply for the apparatus. The secondary of this transformer is connected across the rectifier 344, one side of which connects through line 332 with one side of the machining gap and the other side of which connects with relay coil 338 and shunt resistor 340.

A conductor 342 leads from the resistor and coil to the other side of the machining gap at terminal 348, a diode 350 being connected between the gap and terminal 348. The coil 338 controls opening and closing of the contacts 352, which in turn control the main power input to the apparatus. Connected directly across the machining gap through rectifier 350 is the spillover condenser 334 and its shunt resistor 336. The function of these elements will be explained below. The contacts 352 are closed when coil 338 is energized and deenergization of coil 338 will cause contacts 352 to open instantly cutting off machine power. This cut-off action may involve opening the circuit between source 210 and the apparatus, but preferably will involve cutting off the main A.C. supply, which energizes source 210 through suitable rectifiers, etc. Any desirable type of servo mechanism or remote acting switches may be used, this apparatus being commercially obtainable and not part of the invention being described.

It will be understood that suitable circuitry for energizing the filaments of the various tubes shown is provided and that the polarity of the machining gap may be standard as shown, or it may be reversed for reasons set forth in copending application Serial No. 45,336, filed July 26, 1960, by Robert S. Webb and assigned to the assignee hereof. These details have been omitted for the sake of simplification of disclosure.

The spillover device operates as follows:

In the absence of voltage across the gap, the voltage across condenser 334, and therefore the current flow through resistor 336 and the relay coil 338, will be determined by the selected value of reference voltage across the secondary of transformer 346. This voltage is by design sufficient to maintain contactor 352 closed and thus the main power supply 210 is "on."

So long as the peak voltage across the gap remains below the selected voltage stored in condenser 334, no clipping of voltage by diode 350 occurs and coil 338 remains energized thereby maintaining contactor 352 closed.

Should excess voltage appear across the gap between electrode 224 and work 228, such is instantly clipped by diode 350 and electron flow is from electrode 224 through condenser 334, diode 350 to workpiece 228. This flow of current in the loop including the gap and the spillover condenser displaces a corresponding flow in the loop which comprises the rectifier 344 and the network 338, 340. A slight current displacement of this sort will not affect the operation of the circuit, the contacts 352 being designed such that a predetermined change in voltage across coil 338 is necessary before contacts 352 will open.

Should the current flow in the condenser 334 increase beyond the designed or selected amount, the displacement of current in the network which includes coil 338 will deenergize the coil sufficiently to cause contacts 352 to open, thus interrupting the apparatus power supply and shutting down the machining operation.

During a condition of excess cutting voltage or other condition of operation causing diode 350 to short-circuit, substantially all of the supply current flowing through the rectifier 344 and coil 338 is replaced by current from the higher voltage from secondary 218 of transformer 214. No extreme surge of power results through relay coil 338 or diode circuitry 344, since this is relieved of load by this action and in this manner the protection circuitry remains operative. Should the voltage across condenser 334 become excessively positive from failure of some sort, flow of power through control relay coil 338 is blocked by the appropriate rectifiers in the spillover supply. Insofar as furnishing power is concerned, rectifier assembly 344 is bridge connected. However, in the blocking direction, the corresponding rectifiers appear in series and in this manner, rectifiers 360 and 362 are in series to block excess voltage as are rectifiers 364 and 366. Therefore, if the voltage rating of each rectifier cell is in excess of one-half of that which may be applied externally due to any form of failure, the resulting series connection safely blocks this excess voltage condition from the control circuitry and since this circuit works by a displacement of current, there is no power in the control winding 338 rather than the extreme high surge of power resulting in the circuitry of FIGURE 2. In this manner, the control circuitry remains intact and operates to interrupt power and in itself remains safe. If for any reason relay coil 338 becomes open circuited or short circuited, or if an open circuit occurs in the spillover circuitry, power is immediately interrupted, and therefore this is a self-checking fail safe circuit. The importance of the fail safe circuitry is two-fold. First of all, damage to the machine, or damage to the electrode and work is prevented by malfunction since no over-current can result as in the other circuits. Secondly, and probably more important, the principal purpose of this spillover circuitry is generally to limit peak voltage across the gap for machine safety as well as operator safety. If, for example, a power line became shorted to the insulated member, whether it be the electrode or workpiece and the operator bridged the circuit between the electrode and workpiece, he would be subjected to line voltage in any of the other circuits since that condition would necessarily blow out and render inoperative the protection circuit. In this fail safe circuit, this power would be clipped to a safe value and the power circuitry then de-energized, thus interrupting the dangerous condition while preserving the safety and reliability of the fail safe spillover circuit. Should condenser 334 or resistor 336 short circuit for any reason or should some other malfunction occur tending to draw excess current through relay 338, a fuse 343 may be provided in the line 342 which will blow and thus de-energize relay 338. Contacts 352 will thus be opened to provide a fail safe condition.

It will be seen therefore that I have provided a fail safe protection circuit for EDM apparatus which protects the machine, the work and the operator from any accident or damage from excess voltage. This feature, in combination with the "per pulse cut-off" protection circuit described herein, provides automatic, instantly operative, overall protection for EDM apparatus which at all times protects expensive workpieces from damage that might result from any mulfunction of the apparatus or the power supply.

I claim:
1. In an apparatus for eroding a conductive workpiece by means of intermittent electrical discharge across a gap between an electrode and the workpiece in the presence of dielectric fluid in the gap, a power supply of selected voltage, means for delivering power pulses derived from said power supply across said gap, means for rendering said power supply continuously effective in the gap circuit of said apparatus for furnishing said power pulses, and means for limiting the instantaneous voltage across said gap to a predetermined magnitude lower than that of said power supply comprising, a condenser and a diode connected across the machining gap, said diode being phased to block power of said source from the gap a voltage source connected across said condenser for charging said condenser to a predetermined voltage magnitude lower than the voltage magnitude of said power supply, an electromagnetic circuit controlling means connected in series with said condenser and voltage source, and means operatively associated with said circuit controlling means for cutting-off said power supply in response to rise in peak voltage across said gap by a selected amount in excess of the magnitude of said voltage source.

2. The combination set forth in claim 1 wherein said voltage source is supplied by means including a bridge connected diode rectifier.

3. The combination set forth in claim 1 wherein said voltage source is supplied by means including a bridge connected diode rectifier, each diode of which has a voltage rating in excess of one-half of the voltage of said power supply.

4. A spillover voltage protection circuit for electrical-discharge machining apparatus comprising, a spillover condenser connected across the machining gap, a voltage source for charging said condenser to a magnitude equal to the maximum permissible peak gap voltage, means for preventing current flow from said condenser to said gap but permitting power flow from said gap to said condenser, and means operatively associated with said condenser operable to cut-off the power supply to said apparatus in response to predetermined flow of current from said gap into said condenser.

5. The combination set forth in claim 4 wherein said voltage source is supplied by means including a bridge connected diode rectifier.

6. The combination set forth in claim 4 wherein said voltage source is supplied by means including a bridge connected diode rectifier, each diode of which has a voltage rating in excess of one-half of the voltage of said power supply.

7. In an apparatus for eroding a conducting workpiece by means of intermittent electrical discharge across a gap between an electrode and the workpiece in the presence of dielectric fluid in the gap, a power supply of selected voltage, means for delivering power pulses derived from said power supply across the gap, means for limiting the instantaneous voltage connected across the gap, a reference voltage source operatively connected to said voltage limiting means and having a predetermined magnitude lower than that of said power supply, and switching means operatively connected to said voltage limiting means for cutting off said power supply in response to a rise in peak voltage across the gap by a predetermined amount in excess of the magnitude of said reference voltage source.

8. In an apparatus for eroding a conductive workpiece by means of intermittent electrical discharge across a gap between an electrode and the workpiece in the presence of dielectric fluid in the gap, a power supply of selected voltage, means for delivering power pulses derived from said power supply across the gap, means for limiting the instantaneous voltage connected across the gap, a reference voltage source operatively connected to said voltage limiting means and having a predetermined magnitude lower than that of said power supply, and switching means coupled in series with said power supply and operatively connected to said voltage limiting means for opening the circuit to said power supply in response to a rise in peak voltage across the gap by a predetermined amount in excess of the magnitude of said reference voltage source.

9. In an apparatus for eroding a conductive workpiece by means of intermittent electrical discharge across a gap between an electrode and the workpiece in the presence of dielectric fluid in the gap, a power supply of selected voltage, means for delivering power pulses derived from said power supply across the gap, means for limiting the instantaneous voltage connected across the gap, a reference voltage source operatively connected to said voltage limiting means and across the gap, said reference voltage source operatively connected to said voltage limiting means and having a predetermined magnitude lower than that of said power supply, unidirectional current flow control means connected intermediate said voltage limiting means and the gap, and switching means operatively connected to said voltage limiting means and in series with said power supply for interrupting said power supply in response to a rise in peak voltage across the gap by a predetermined amount in excess of the magnitude of said reference voltage source.

10. In an apparatus for eroding a conductive workpiece by means of intermittent electrical discharge across a gap between an electrode and the workpiece in the presence of dielectric fluid in the gap, a power supply of selected voltage, means for delivering power pulses derived from said power supply across the gap, a condenser connected across the gap, a reference voltage source operatively connected across said condenser and across the gap, said reference voltage source having a predetermined magnitude lower than that of said power supply, a forwardly poled diode connected intermediate the gap and said condenser, a load resistor connected across said condenser, and switching means operatively connected to said condenser for interrupting said power supply in response to a rise in peak voltage across the gap by a predetermined amount in excess of the magnitude of said reference voltage source.

11. In an apparatus for eroding a conductive workpiece by means of intermittent electrical discharge across a gap between an electrode and the workpiece in the presence of dielectric fluid in the gap, a power supply of selected voltage, means for delivering power pulses derived from said power supply across the gap, a condenser connected across the gap, a reference voltage source operatively connected across said condenser and across the gap, said reference voltage source having a predetermined magnitude lower than that of said power supply, a forwardly poled diode connected intermediate the gap and said condenser, a load resistor connected across said condenser, and switching means connected intermediate the junction of said diode with said condenser and said reference voltage source for interrupting said power supply in response to a rise in peak voltage across the gap by a predetermined amount in excess of the magnitude of said reference voltage source.

12. The combination as set forth in claim 11 wherein said switching means comprises a relay having control contacts operatively connected to and controlling said power supply.

13. In an apparatus for eroding a conductive workpiece by intermittent electrical discharge across a gap between an electrode and the workpiece in the presence of dielectric fluid in the gap, a power supply of selected voltage, means for delivering power pulses derived from said power supply across the gap, a condenser connected across the gap, a reference voltage source operatively connected across said condenser and having a predetermined magnitude lower than that of said power supply, a reverse poled diode between said reference voltage source and said condenser, and switching means connected intermediate said reference voltage source and said diode for opening the circuit to said power supply in response to a rise in peak voltage across the gap by a predetermined amount in excess of the magnitude of said reference voltage source.

14. The combination as set forth in claim 13 wherein said switching means comprises a relay having control contacts operatively connected to and controlling said power supply.

15. The combination as set forth in claim 14 wherein a pair of serially connected, smoothing condensers are connected across said power supply and said reference voltage source, respectively.

References Cited in the file of this patent

UNITED STATES PATENTS

| | | |
|---|---|---|
| 2,769,078 | Matulaitis | Oct. 30, 1956 |
| 2,841,686 | Williams | July 1, 1958 |
| 2,891,137 | Graell | June 16, 1959 |